US011245677B2

(12) United States Patent
Compagno et al.

(10) Patent No.: US 11,245,677 B2
(45) Date of Patent: Feb. 8, 2022

(54) SECURE PACKET MODIFICATION

(71) Applicant: Cisco Technology, Inc., San Jose, CA (US)

(72) Inventors: Alberto Compagno, Clamart (FR); Michele Papalini, Issy les Moulineaux (FR); Luca Muscariello, Paris (FR); Giovanna Carofiglio, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 598 days.

(21) Appl. No.: 16/044,672

(22) Filed: Jul. 25, 2018

(65) Prior Publication Data
US 2020/0036689 A1    Jan. 30, 2020

(51) Int. Cl.
*H04L 29/06* (2006.01)
*H04L 9/32* (2006.01)

(52) U.S. Cl.
CPC ........ *H04L 63/0442* (2013.01); *H04L 9/3247* (2013.01); *H04L 63/12* (2013.01); *H04L 65/605* (2013.01)

(58) Field of Classification Search
CPC ... H04L 63/0442; H04L 9/3247; H04L 63/12; H04L 65/605; H04L 2209/68; H04L 67/2842; H04L 67/12; H04L 61/301; H04L 61/1582; H04L 63/0823; G06F 21/64
See application file for complete search history.

(56) References Cited

U.S. PATENT DOCUMENTS

| 9,467,492 | B2 | 10/2016 | Mosko et al. | |
| 9,536,059 | B2 | 1/2017 | Solis et al. | |
| 9,602,596 | B2 | 3/2017 | Mosko | |
| 10,009,266 | B2 | 6/2018 | Wood et al. | |
| 2003/0115251 | A1* | 6/2003 | Fredrickson | H04L 63/0428 709/201 |
| 2011/0078458 | A1* | 3/2011 | Furukawa | G06F 21/64 713/189 |
| 2016/0014027 | A1* | 1/2016 | Oran | H04L 67/327 709/213 |

(Continued)

OTHER PUBLICATIONS

International Search Report and Written Opinion in counterpart International Application No. PCT/US2019/042332, dated Oct. 1, 2019, 16 pages.

(Continued)

*Primary Examiner* — Matthew Smithers
*Assistant Examiner* — Mirza Israr Javed (57) ABSTRACT

In various implementations, a network device receives a packet from a content producer. The packet includes data and further includes a signature generated by the content producer, based on the data, using a private key of the content producer. The network device modifies the packet without affecting the signature and forwards the modified packet toward a user device. The network device also sends the user device a manifest specifying how the packet was modified. The user device receives the packet and manifest, restores the packet's original data based on the manifest, and verifies the original data using the signature and a public key corresponding to the private key of the content producer. In response to verification of the original data, an application on the user device is allowed to use the data.

20 Claims, 8 Drawing Sheets

(56) References Cited

U.S. PATENT DOCUMENTS

2017/0085491 A1  3/2017  Mosko et al.
2020/0036689 A1* 1/2020  Compagno ............. H04L 63/12

OTHER PUBLICATIONS

B. Carpenter, "Middleboxes: Taxonomy and Issues", IBM Zurich Research Laboratory, Feb. 2002, pp. 1-27.
Cesar Ghali et al., "(The Futility of) Data Privacy in Content-Centric Networking", Computer Science Department; University of California Irvine, WPES'16, Oct. 24, 2016, Vienna, Austria, pp. 1-10.
Van Jacobson et al., "Networking Named Content", Palo Alto Research Center, Palo Alto, CA, CoNEXT '09, Dec. 1-4, 2009, Rome Italy, pp. 1-12.
M. Mosko et al., "CCNx Semantics (draft-irtf-icnrg-ccnxsemantics-07", ICNRG, University of California, Internet Draft, Intended Status, Experimental, Expires: Sep. 20, 2018, pp. 1-35.
Ivan O. NUNES et al. "Namespace Tunnels in Content-Centric Networks", University of California Irvine, pp. 1-8.
Lixia Zhang et al., "Named Data Networking (NDN) Project", NDN-0001, Oct. 30, 2010, PARC Tech Report 2010-003, pp. 1-27.
Zhang, L. et al., "Named Data Networking", Jul. 1, 2014, 9 pages.

* cited by examiner

SECURE PACKET MODIFICATION

TECHNICAL FIELD

The present disclosure generally relates to secure packet modification, and in particular, to allowing trusted network devices to modify a packet being routed from a content producer to a user device.

BACKGROUND

Digital signatures may be used to ensure end-to-end integrity for data communications. For example, a content producer uses a private key to generate a signature for a packet, based on the data in the packet. The signature may be added to the packet, which is transmitted to a user device. The user device verifies the data in the packet using the signature and a public key that corresponds to the private key of the content producer. If the data has been modified during transmission of the packet, the verification will fail. Such a technique is used, for example, in Information-Centric Networking (ICN) and hybrid ICN (hICN). This technique, however, prevents both untrusted and trusted intermediate entities from modifying the data. It may desirable in some circumstances for trusted intermediate entities (e.g., proxy servers, firewalls, network-address translators, etc.) to be able to modify the data.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein enable a network device securely to modify a data packet that is in transit from a content producer to a user device and enable the user device to use the data packet even though it has been modified. For example, a networking method is performed by a network device that includes one or more processors and memory (e.g., non-transitory memory) storing instructions for execution by the one or more processors. In the method, a first packet is received from a content producer. The first packet includes data and further includes a signature generated by the content producer, based on the data, using a private key of the content producer. The first packet is modified without affecting the signature and, as modified, is forwarded toward the user device. The user device is sent a manifest specifying how the first packet was modified.

In another example, a method of receiving content is performed by a user device that includes one or more processors and memory (e.g., non-transitory memory) storing instructions for execution by the one or more processors. In the method, a first packet is received that originated from a content producer and was routed to the user device through a network device. The first packet includes data and further includes a signature generated by the content producer, based on original data of the first packet, using a private key of the content producer. The original data has been modified by the network device. A manifest is received specifying how the network device modified the data. The original data is restored based on the manifest and is verified using the signature and a public key corresponding to the private key of the content producer. In response to verifying the original data, an application on the user device is allowed to use the data.

Figure 1:
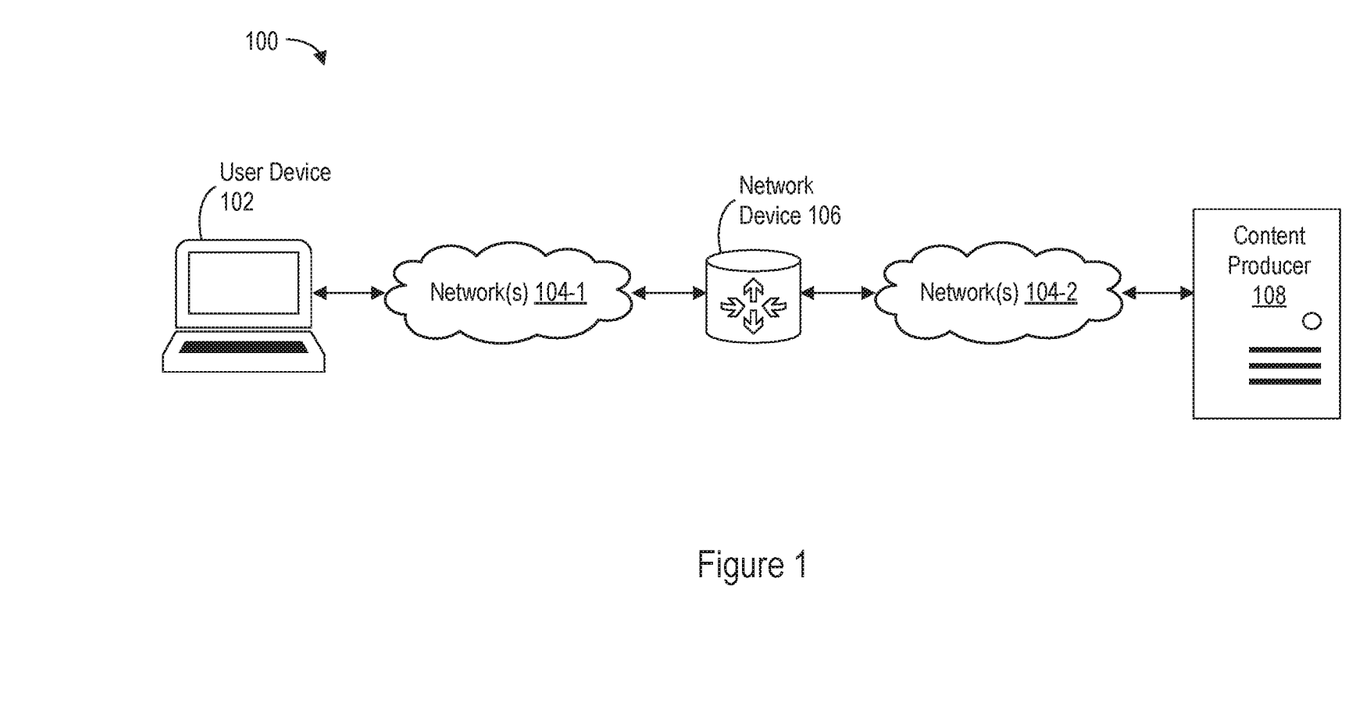
FIG. 1 is a block diagram illustrating a network architecture in accordance with some implementations.

FIG. 1 is a block diagram illustrating a network architecture 100 in accordance with some implementations. In the network architecture 100, one or more user devices 102 (a single user device 102 is shown for simplicity) are communicatively coupled to a content producer 108 through one or more networks that include a network device 106. The user device 102 is communicatively coupled through one or more networks 104-1 to the network device 106, which is communicatively coupled through one or more networks 104-2 to the content producer 108. In some implementations, the one or more networks 104 include public communication networks, private communication networks, or a combination of both public and private communication networks. For example, the one or more networks 104 can include any network (or combination of networks) such as the Internet, other wide area networks (WAN), local area networks (LAN), metropolitan area networks (MAN), peer-to-peer networks, and/or ad-hoc connections.

The user device 102 runs one or more applications that use content from the content producer. To obtain the content, the user device 102 sends a packet to the content producer requesting the content and receives a data packet in response containing at least a portion of the requested content. The request and/or data packets may contain a name for the requested content. The name may include a prefix that is specific to the content producer 108 and is common to content produced by the content producer 108. The name may be hierarchical (e.g., may include multiple portions separated by slashes). For example, the name may be a Uniform Resource Locator (URI), or other suitable locator, that includes a routable portion associated with the content producer 108 and a non-routable portion that specifies the content.

Examples of the user device 102 include, without limitation, a mobile electronic device (e.g., mobile phone), wearable computing device, laptop computer, tablet computer, desktop computer, or another electronic device. Examples of the network device 106 include, without limitation, a router or middlebox (e.g., proxy server, firewall, or network address translator). The content producer 108 may be instantiated on a server system, an Internet-of-Things (IoT) device, a user device of a user who posts content, or another electronic device that publishes content. If the content producer 108 is instantiated on a server system, the server system may be a single server computer or multiple server computers (e.g., multiple computing devices working together to perform the actions of a server system, such as for cloud computing).

In some implementations, the network architecture 100 implements ICN or hICN. The content producer 108 generates and publishes content under a specific name prefix. User devices 102 request content by name through requests known as interests. Intermediate entities such as the network device 106 may cache content and service interests if the requested content is cached. Accordingly, the network device 106 may be configured for ICN and/or hICN.

Figure 2A:
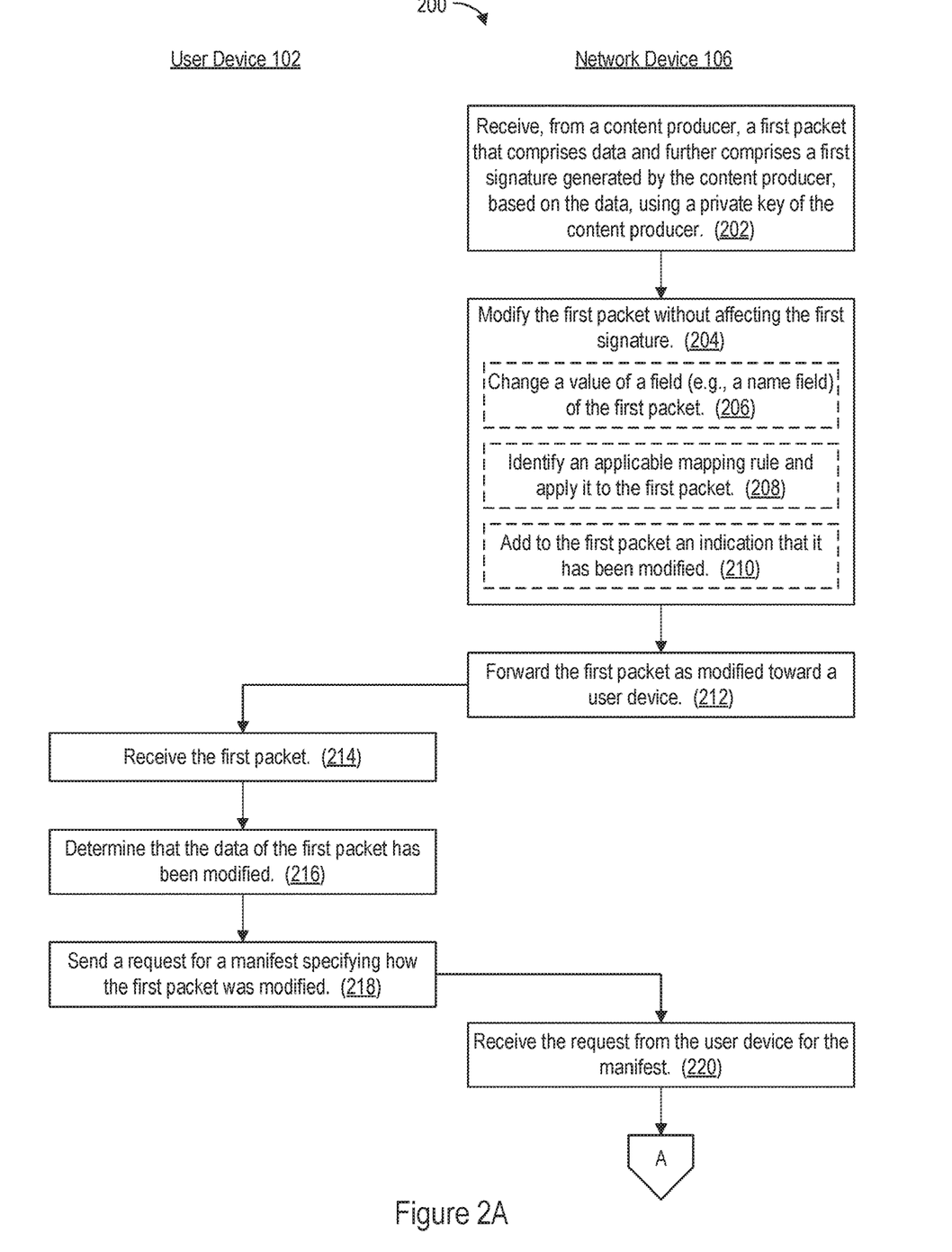
FIGS. 2A and 2B show a flowchart illustrating a networking method in accordance with some implementations.
Figure 2B:
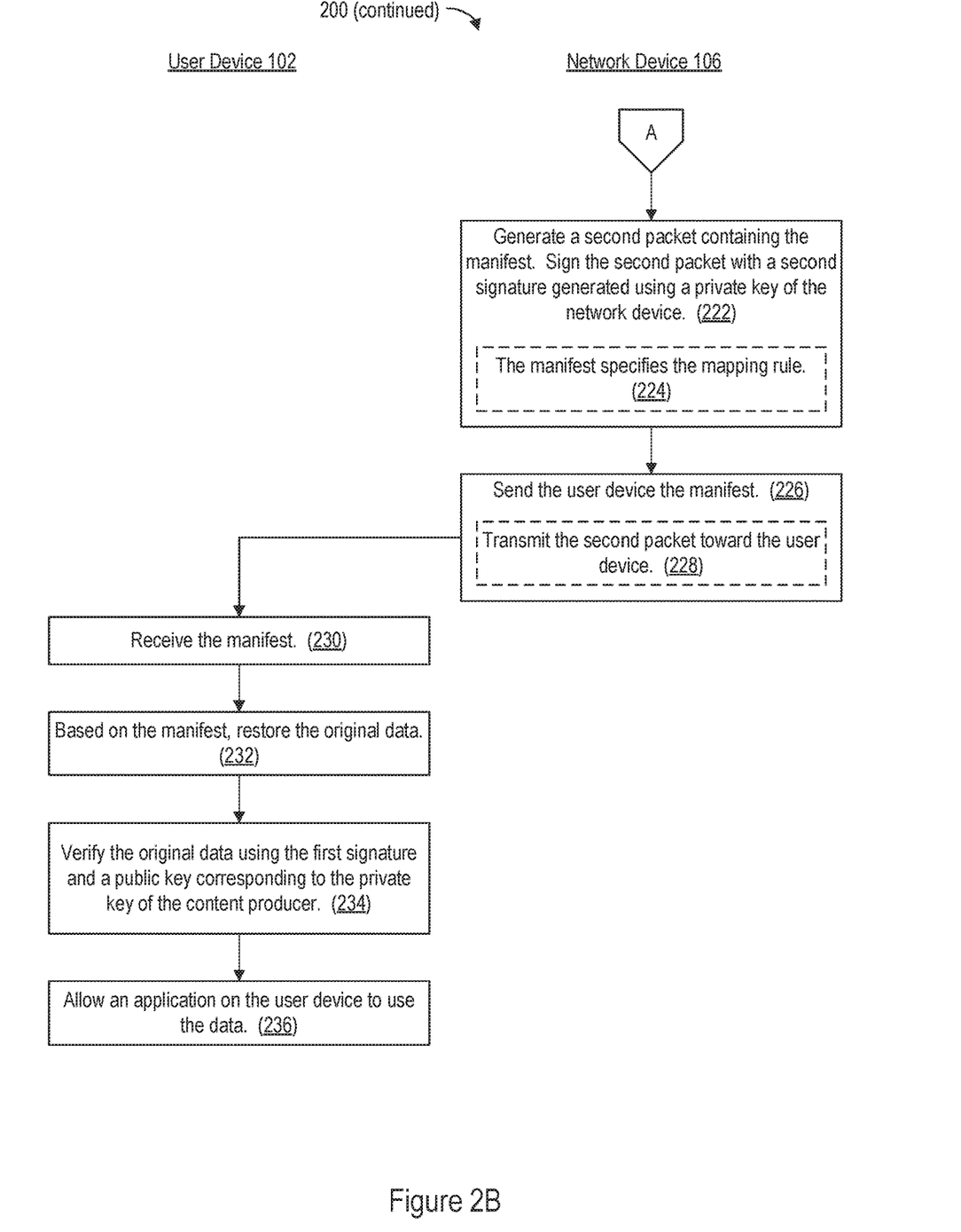

FIGS. 2A and 2B show a flowchart illustrating a networking method 200 in accordance with some implementations. Respective steps in the method 200 are performed by a user device 102 (e.g., user device 500, FIG. 5) and network device 106 (e.g., network device 400, FIG. 4), as shown. Steps in the method 200 may be combined or broken out and the sequence of the method 200 may be modified for steps that are not order-dependent. The method 200 is described with reference to FIGS. 3A-3F, which illustrate operations within the network architecture 100 that are examples of steps in the method 200 or are performed in conjunction with the method 200, according to some implementations. The one or more networks 104-1 and 104-2, as shown in FIG. 1, are omitted from FIGS. 3A-3F for visual simplicity.

In some implementations, the method 200 is performed in response to a request from the user device 102 for content generated and/or published by the content producer 108. For example, the network device 106 receives, from the user device 102, a packet 302-1 (FIG. 3A) (e.g., an ICN/hICN interest) that is directed to the content producer 108 (e.g., that specifies a prefix corresponding to the content producer 108) and that includes a request for the content (e.g., that specifies the name of the content in a name field 304). The network device 106 may modify the packet 302-1 and forward the packet 302-2 (FIG. 3B) as modified toward the content producer 108. For example, the value of a field 306 ("field x") of the packet 302-1 is modified from α (FIG. 3A) to β (FIG. 3B) using a mapping rule obtained from a lookup table (LUT) 308 in the network device 106, resulting in a modified packet 302-2 (FIG. 3B) that is forwarded to the content producer 108. In this example, the key for the lookup is the name in field 304. The prefix in field 304 ("prefixA") is determined to match a mapping rule (Field x: α↔β, where Field x is field 306), which is used to modify the packet 302.

In the method 200, the network device 106 receives (202, FIG. 2A), from the content producer 108, a packet 310-1 (FIG. 3C) that includes data and further includes a signature 312 generated by the content producer 108, based on the data, using a private key of the content producer. In some implementations, the packet 310-1 is received in response to a first ICN/hICN interest (e.g., packet 302, FIGS. 3A-3B) sent from the user device 102 to the content producer 108.

Figure 3A:
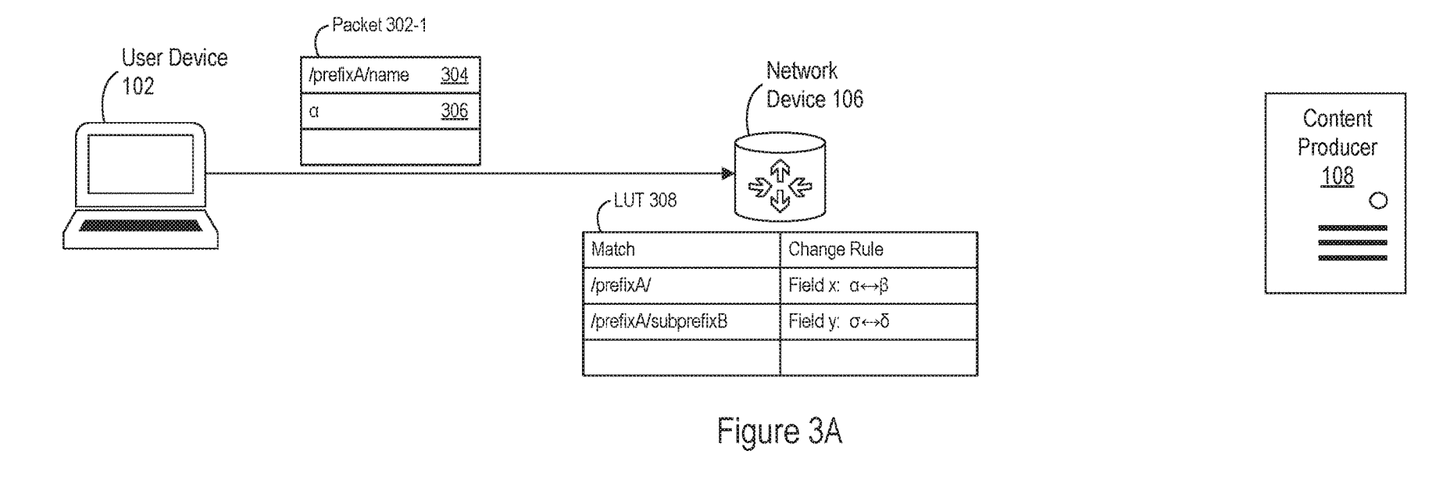
FIGS. 3A-3F illustrate operations performed in the network architecture of FIG. 1 as part of or in conjunction with the method of FIGS. 2A-2B, in accordance with some implementations.
Figure 3B:
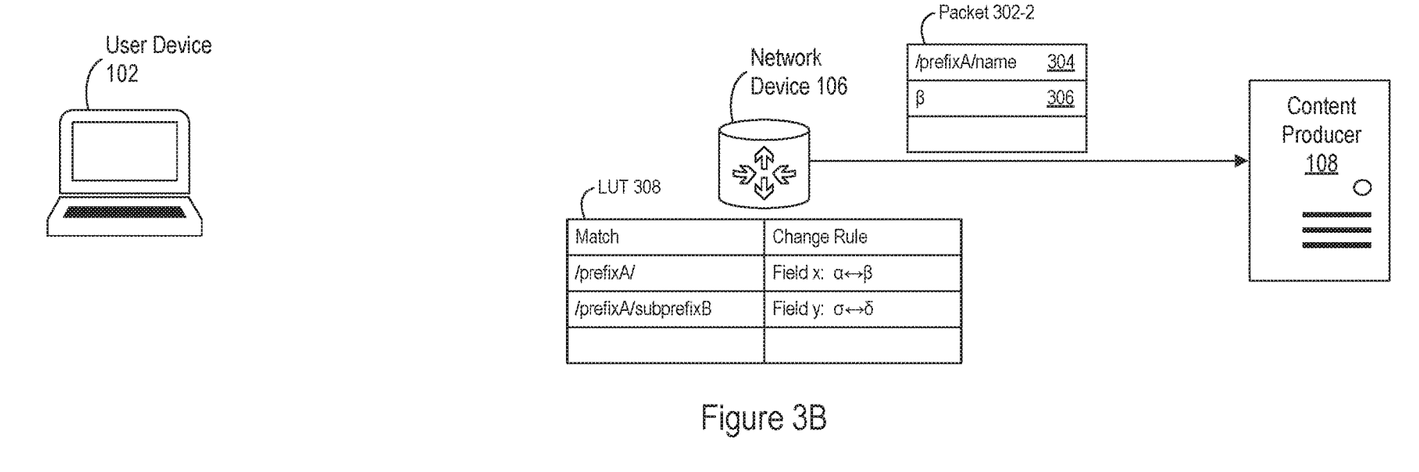
Figure 3C:
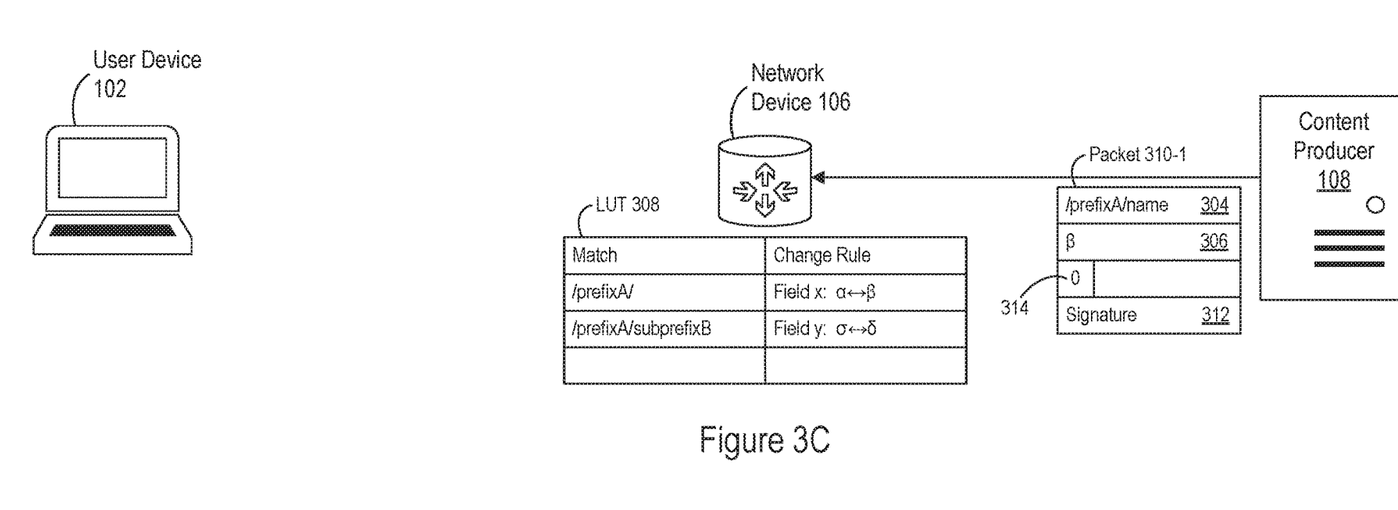
Figure 3D:
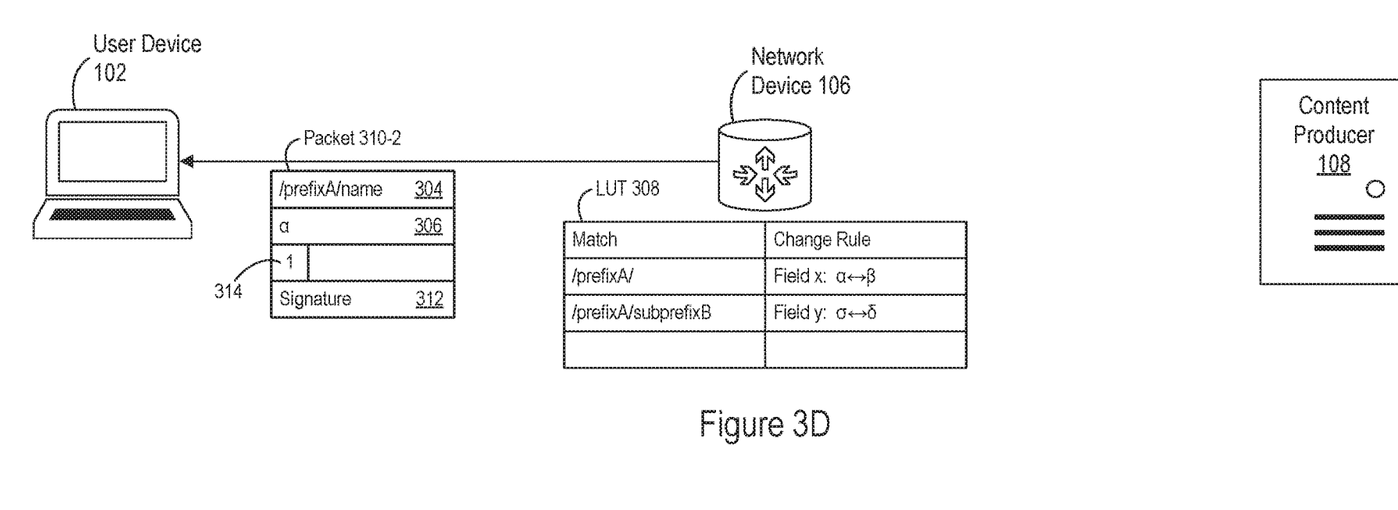
Figure 3E:
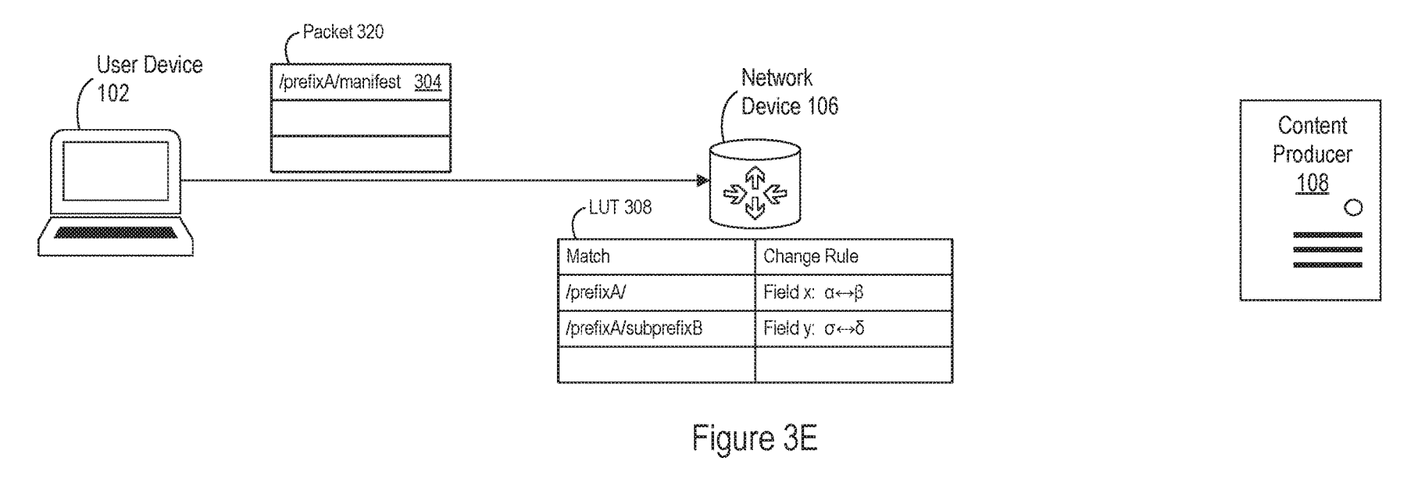

The network device 106 modifies (204) the packet 310 without affecting the signature 312 and, in some implementations, without signing the packet 310 itself. In some implementations, the network device 106 changes (206) a value of a field. For example, the data of the packet 310-1 includes content and a name for the content, with the name being specified in a name field 304, and the network device 106 changes the name field 304. Alternatively, or in addition, a value in a different field 306 is changed (e.g., from (3 to a, as shown in the example of FIGS. 3C and 3D).

In some implementations, the network device 106 identifies (208) a mapping rule that is applicable to the packet 310 and applies it to the packet 310. For example, the network device 106 performs a lookup in the LUT 308 (e.g., using the name from name field 304 as the key) to identify a mapping rule that applies to the packet 310 (e.g., the mapping rule Field x: α↔β applies to all packets with "/prefixA/", which includes the packet 310). The mapping rule specifies a change to be made to a field (e.g., field 306). The network device 106 makes the change to the field in the packet 310, in accordance with the mapping rule. The mapping rule may apply to the name of the content of the packet 310 (wherein the packet data includes the content and the name, and may include other information as well), and therefore may apply to the name field 304, such that the name field 304 is used as the key for the mapping-rule lookup and the applicability of a rule is determined based on the name or a portion (e.g., hierarchical portion) of the name. The name may include a prefix corresponding to the content producer 108, and the rule may apply to the prefix (e.g., "/prefixA/"), or to a sub-prefix of the prefix (e.g., "/prefixA/subprefixB").

In some implementations, the network device 106 adds (210) to the packet 310 an indication that the packet 310 has been modified. For example, a flag 314 (FIGS. 3C-3D) is asserted (e.g., changed from '0' to '1,' or vice-versa) in the packet 310 indicating that the packet 310 has been modified (i.e., has been changed from the packet 310-1 to the packet 310-2). The flag 314 was de-asserted when the network device 106 received the packet 310-1, as shown in FIG. 3C.

The network device 106 forwards (212) the packet 310-2 as modified toward the user device 102, which receives (214) the packet 310-2.

The user device 102 determines (216) that the data of the packet 310-2 has been modified. In some implementations, the user device 102 makes this determination by detecting that the packet 310-2 contains the indication, added by the network device 106, that the packet 310-2 has been modified (e.g., by detecting that the flag 314 is asserted). In response to this determination, the user device 102 sends (218) a request (e.g., packet 320, FIG. 3E) for a manifest specifying how the packet 310 was modified. In some implementations, the request is an ICN/hICN interest. For example, packet 320 is an ICN/hICN interest that specifies the name ("/prefixA/manifest") of the desired manifest in its name field 304.

Figure 3F:
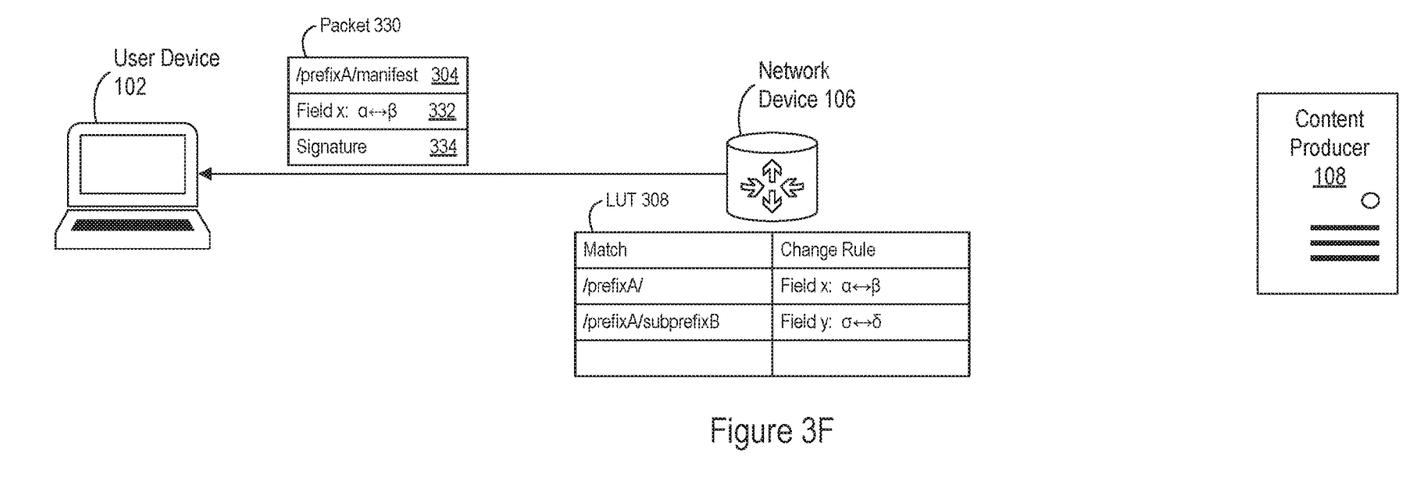

The network device 106 receives (220) the request from the user device 102 for the manifest. In response, in accordance with some implementations, the network device 106 generates (222, FIG. 2B) a packet 330 (FIG. 3F) containing the manifest and signs (222) the packet 330 with a signature 334 generated using a private key of the network device. The signature 334 is generated based on the content of the packet 330 (i.e., the manifest and any other data in the packet 330), such that the signature 334 will become invalid if the packet 330 is modified during transmission. In some implementations, the manifest specifies (224) the mapping rule. For example, the relevant mapping rule is obtained from the LUT 308 and included in a field 332 of the packet 330 (FIG. 3F).

The network device 106 sends (226) the user device 102 the manifest, for example by transmitting (228) the packet 330 toward the user device 102. The user device 102 receives (230) the manifest. The manifest thus may be received in response to the request of steps 218 and 220. Alternatively, steps 218 and 220 may be omitted. For example, the manifest may be sent in conjunction with the packet 310 (FIGS. 3C-3D) (e.g., such that the network device 106 generates and sends the packet 330 without receiving a request for the manifest from the user device 102).

In some implementations, the user device 102 verifies the manifest using the signature 334 (FIG. 3F) and a public key corresponding to the private key of the network device 106. If the manifest cannot be verified, the user device 102 does not proceed with the method 200, because the manifest cannot be confirmed as reliable: lack of confirmation may result from modification of the packet 330 during transmission (e.g., by another network device between the network device 106 and the user device 102). Instead, the user device 102 may send another request for the manifest.

Based on the manifest (and, in some implementations, in response to verification of the manifest), the user device 102 restores (232) the original data: the data in the packet 310-2 (FIG. 3D) is modified to undo the modification(s) made by the network device 106 and thus to equal the original data in the packet 310-1 (FIG. 3C). For example, the mapping rule in the field 332 of the packet 330 is applied to the packet 310-2 to restore the original data.

The user device 102 then verifies (234) the original data using the signature 312 (FIGS. 3C-D) and a public key corresponding to the private key of the content producer 108. This verification would have failed if performed on the data of the packet 310-2 as received, because the data had been modified in transit. But once the original data has been restored, the verification succeeds: the restored data is confirmed to be correct. The user device 102 therefore knows that the data has been properly received and that end-to-end data integrity is ensured. Accordingly, the user device 102 allows (236) an application (e.g., application 516, FIG. 5) on the user device 102 to use the data (e.g., to present the content to the user).

The method 200 thus enables the network device 106 securely to modify a data packet that is in transit from the content producer 108 to the user device 102. The user device 102 is able to use the received data packet even though it has been modified. And the network device 106 is able to modify packets without having to generate new signatures for all modified packets, thereby reducing computational workload, power consumption, and packet delay for the network device 106. For example, generating signatures only for manifests as opposed to for every modified packet significantly reduces the number of signatures to be generated. Data traffic is also reduced, because modified packets need not carry additional headers and signatures.

The method 200 is particularly beneficial in several scenarios. For example, the content producer 108 may be mobile. The prefix of the content producer 108 may be associated with a particular Internet service provider (ISP) used by the content producer 108, such that request packets (e.g., interests) are routed to the network of the ISP. The content producer 108, however, may roam outside of the ISP's network (e.g., may roam abroad) and instead use a different network (e.g., the network of a different ISP). The prefix in request and/or data packets may be modified accordingly, such that packets are routed to and from the different network so that the content producer 108 remains reachable.

In another example, the content producer 108 is an IoT device that connects to the Internet (or other network) through a local network (e.g., a mesh or star network) and a gateway (e.g., an access point). The IoT device may publish content using a shortened (e.g., compressed) prefix that is routable over the local network but not over the Internet or other, wider network. The gateway may translate the name that includes the shortened prefix into a name with a full (e.g., uncompressed) prefix for outbound packets, and vice-versa for inbound packets, in accordance with the method 200. The full prefix is routable over the Internet or other, wider network. The IoT device may also, or alternatively, use another shortened field that is mapped to a longer field by the gateway in accordance with the method 200.

In still another example, the method 200 may be used to avoid information leakage through the name in request packets (e.g., interests) and/or data packets. The name itself may provide some information about the corresponding content and thus may be insecure. Accordingly, the method 200 may be used to map the insecure name to another, secure name that does not provided any hints about the content and thus does not leak information. Similar mapping may be performed for any other packet field that is insecure and may leak information.

Figure 4:
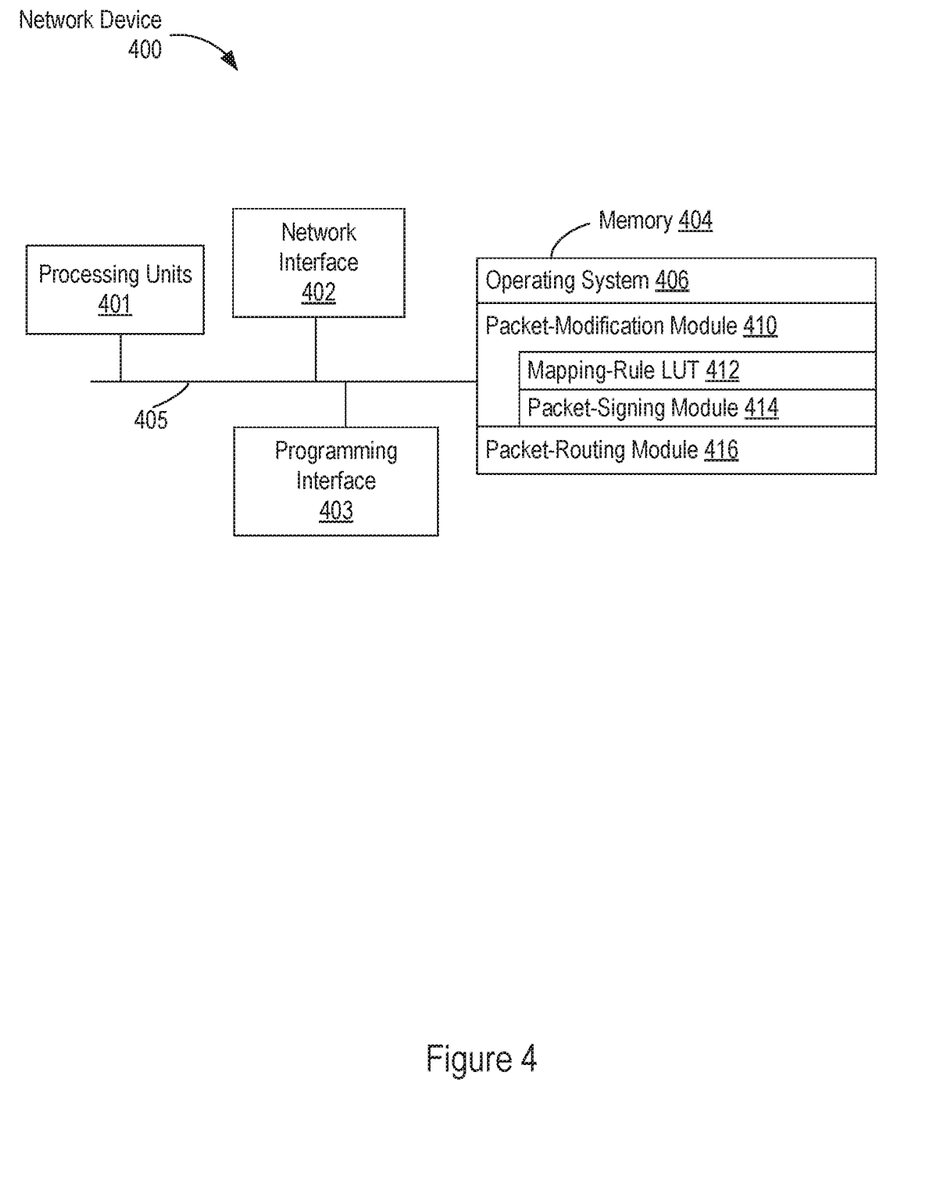
FIG. 4 is a block diagram of a network device in accordance with some implementations.

FIG. 4 is a block diagram of a network device 400 (e.g., network device 106, FIGS. 1 and 3A-3F) according to some implementations. While certain features are illustrated, those of ordinary skill in the art will appreciate from the present disclosure that various other features have not been illustrated for the sake of brevity, and so as not to obscure more pertinent aspects of the implementations disclosed herein. To that end, in some implementations the network device 400 includes one or more processing units (e.g., CPUs, network processors, etc.) 401, a network interface 402, a programming interface 403, memory 404, and one or more communication buses 405 for interconnecting these and various other components.

In some implementations, the memory 404 or a non-transitory computer-readable storage medium of the memory 404 stores the following programs, modules, and data structures, or a subset thereof: an optional operating system 406, a packet-modification module 410, and a packet-routing module 416. The operating system 406 includes procedures for handling various basic system services and for performing hardware-dependent tasks. The packet-modification module 410 includes a mapping-rule LUT 412 (e.g., LUT 308, FIGS. 3A-3F), instructions for performing lookups in the LUT 412 and for applying mapping rules, and a packet-signing module 414 that includes a private key (e.g., for generating the signature 334, FIG. 3F). The packet-routing module 416 includes instructions for transmitting packets. The memory 404 or a non-transitory computer-readable storage medium of the memory 404 thus may include instructions for performing the steps of the network device 106 in the method 200 (FIGS. 2A-2B).

Figure 5:
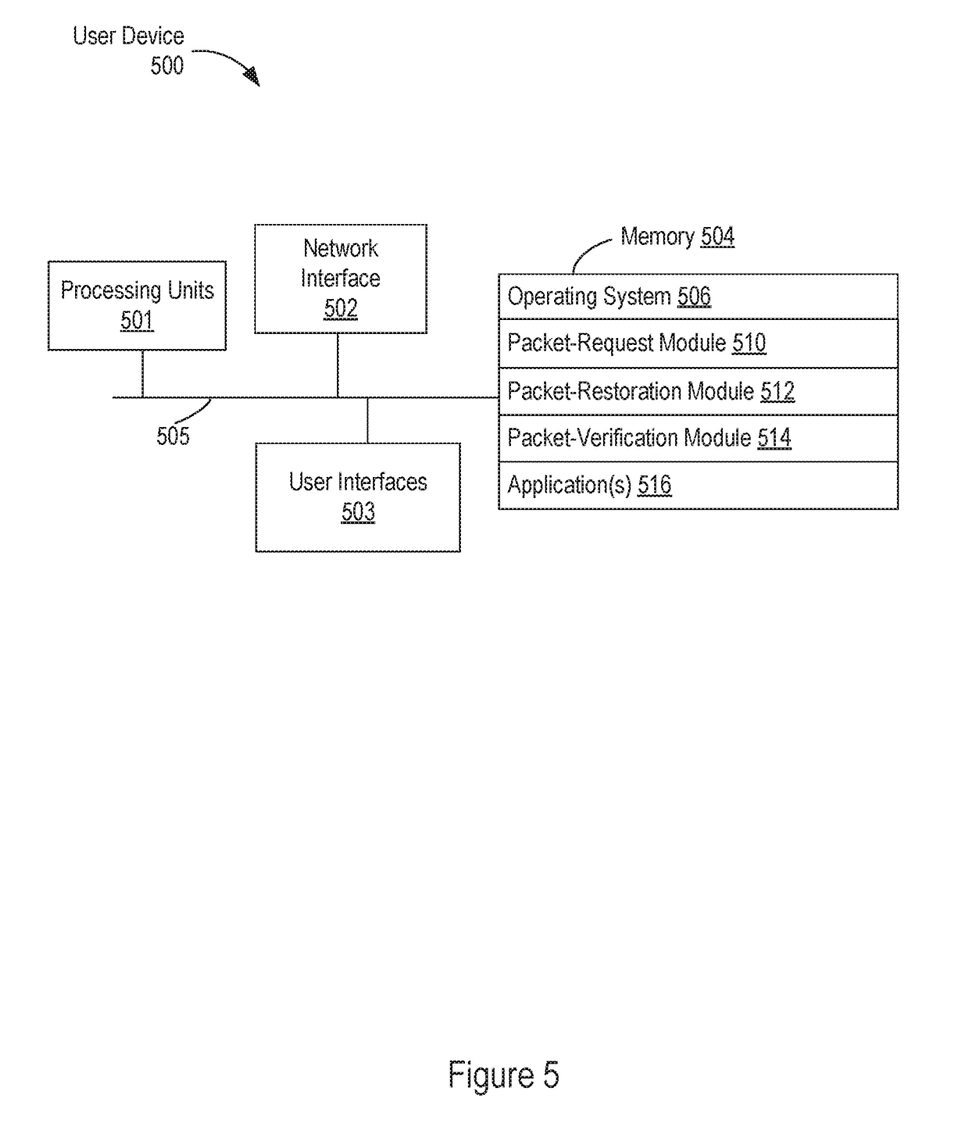
FIG. 5 is a block diagram of a user device in accordance with some implementations.

FIG. 5 is a block diagram of a user device 500 (e.g., user device 102, FIGS. 1 and 3A-3F) according to some implementations. While certain features are illustrated, those of ordinary skill in the art will appreciate from the present disclosure that various other features have not been illustrated for the sake of brevity, and so as not to obscure more pertinent aspects of the implementations disclosed herein.

To that end, in some implementations the user device 500 includes one or more processing units (e.g., CPUs) 501, a network interface 502, user interfaces 503 (e.g., for receiving user input; for displaying and/or playing content), memory 504, and one or more communication buses 505 for interconnecting these and various other components.

In some implementations, the memory 504 or the non-transitory computer-readable storage medium of the memory 504 stores the following programs, modules, and data structures, or a subset thereof: an operating system 506, a packet-request module 510, a packet-restoration module 512, a packet-verification module 514, and one or more applications 516. The operating system 506 includes procedures for handling various basic system services and for performing hardware-dependent tasks. The packet-request module 510, packet-restoration module 512, and packet-verification module 514 include instructions for performing the steps of the user device 102 in the method 200 (FIGS. 2A-2B). An application 516 may use (e.g., display and/or play) content that is obtained through the method 200.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first packet could be termed a second packet, and, similarly, a second packet could be termed a first packet, without changing the meaning of the description, so long as all occurrences of the first packet are renamed consistently and all occurrences of the second packet are renamed consistently. The first packet and the second packet are both packets, but they are not the same packet.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A networking method, comprising,
at a network device comprising one or more processors and memory storing instructions for execution by the one or more processors:
receiving, from a content producer, a first packet that comprises data comprising content requested by a user device and a name for the content and further comprises a signature generated by the content producer, based on the data, using a private key of the content producer, wherein the name for the content includes a prefix corresponding to the content producer;
modifying the first packet without affecting the signature;
forwarding the first packet as modified toward the user device;
generating a second packet containing a manifest specifying at least one modification made to the first packet by the network device, wherein the second packet comprises a name for the manifest that includes the prefix corresponding to the content producer;
signing the second packet using a private key of the network device; and
upon obtaining a request from the user device for the manifest, transmitting the second packet including the manifest toward the user device in response to the request.

2. The method of claim 1, wherein:
the network device is configured for information-centric networking (ICN) or hybrid information-centric networking (hICN);
the first packet is received in response to a first ICN or hICN interest sent from the user device to the content producer; and
the request for the manifest is a second ICN or hICN interest.

3. The method of claim 1, wherein modifying the first packet comprises changing a value of a field of the first packet.

4. The method of claim 3, wherein:
the data of the first packet comprises content and a name for the content; and
the field specifies the name.

5. The method of claim 3, wherein modifying the first packet further comprises adding to the first packet an indication that the first packet has been modified.

6. The method of claim 5, wherein adding the indication to the first packet comprises asserting a flag in the first packet indicating that the first packet has been modified, the flag being de-asserted when the network device receives the first packet.

7. The method of claim 1, wherein modifying the first packet comprises:
performing a lookup based, at least in part, on the prefix corresponding to the content producer to identify a mapping rule that applies to the first packet, wherein the mapping rule specifies a change to be made to a field; and making the change to the field in the first packet, in accordance with the mapping rule.

8. The method of claim 7, wherein
the mapping rule applies to the name for the content.

9. The method of claim 7, wherein
the mapping rule applies to the prefix corresponding to the content producer included in the name for the content and wherein the field to which the change is made specifies the name.

10. The method of claim 1, further comprising, at the network device, before receiving the first packet from the content producer:

receiving, from the user device, a third packet directed to the content producer, wherein the third packet includes a request for the content;

modifying the third packet; and forwarding the third packet as modified toward the content producer.

11. The method of claim 10, wherein:

the network device is configured for information-centric networking (ICN) or hybrid information-centric networking (hICN); and the third packet is an ICN or hICN interest that requests the content.

12. The method of claim 1, wherein modifying the first packet without affecting the signature includes the network device modifying the first packet and not signing the first packet.

13. The method of claim 1, wherein modifying the first packet is performed based, at least in part, on the prefix corresponding to the content producer that is included in the name for the content.

14. The method of claim 1, wherein the manifest enables the user device to undo the at least one modification made to the first packet by the network device in order to restore original data of the first packet.

15. A method of receiving content, comprising;

at a user device comprising one or more processors and memory storing instructions for execution by the one or more processors:

receiving a first packet originating from a content producer and having been routed to the user device through a network device, wherein the first packet comprises data comprising content requested by the user device and a name for the content and further comprises a first signature generated by the content producer, based on original data of the first packet, using a private key of the content producer and the original data has been modified by the network device, wherein the name for the content includes a prefix corresponding to the content producer;

determining that the data of the first packet has been modified;

in response to determining that the data of the first packet has been modified, sending a request for a manifest specifying at least one modification made to the data by the network device;

receiving a second packet comprising the manifest specifying the at least one modification made to the data by the network device, wherein the second packet comprises a name for the manifest that includes the prefix corresponding to the content producer;

based on the manifest, restoring the original data;

verifying the original data using the first signature and a public key corresponding to the private key of the content producer; and in response to verifying the original data, allowing an application on the user device to use the data.

16. The method of receiving content of claim 15, wherein:

receiving the manifest comprises receiving a second packet originating from the network device and comprising the manifest and a second signature generated by the network device using a private key of the network device;

the method further comprising, at the user device, verifying the manifest using the second signature and a public key corresponding to the private key of the network device; and restoring the original data is performed in response to verifying the manifest.

17. The method of receiving content of claim 15, wherein determining that the data of the first packet has been modified comprises detecting that the first packet contains an indication that the first packet has been modified, the indication having been added to the first packet by the network device.

18. The method of receiving content of claim 15, wherein:

a field in the first packet has been modified by the network device; and the manifest specifies a mapping rule used by the network device to modify the field.

19. A non-transitory computer-readable storage medium including instructions that, when executed by a processor, cause the processor to perform operations, comprising:

receiving, at a network device from a content producer, a first packet that comprises data comprising content requested by a user device and a name for the content and further comprises a signature generated by the content producer, based on the data, using a private key of the content producer, wherein the name for the content includes a prefix corresponding to the content producer;

modifying the first packet without affecting the signature;

forwarding the first packet as modified toward the user device;

generating a second packet containing a manifest specifying at least one modification made to the first packet by the network device, wherein the second packet comprises a name for the manifest that includes the prefix corresponding to the content producer;

signing the second packet using a private key of the network device; and upon obtaining a request from the user device for the manifest, transmitting the second packet including the manifest toward the user device in response to the request.

20. The non-transitory computer-readable storage medium of claim 19, wherein modifying the first packet comprises changing a value of a field of the first packet and wherein the field to which the change is made specifies the name.

* * * * *